United States Patent [19]
Luke et al.

[11] 3,835,459

[45] Sept. 10, 1974

[54] BIREFRINGENCE READ $Bi_4Ti_3O_2$ DISPLAY AND MEMORY DEVICE

[75] Inventors: Theodore E. Luke, Englewood; Stewart E. Cummins, New Carlisle, both of Ohio

[73] Assignee: The United States of America as represented by the Secretary of the Air Force, Washington, D.C.

[22] Filed: Apr. 18, 1973

[21] Appl. No.: 352,388

Related U.S. Application Data

[62] Division of Ser. No. 232,173, March 6, 1972.

[52] U.S. Cl.. 340/173.2, 340/173 LS, 340/173 LM, 340/174.1 M

[51] Int. Cl. ........................ G11c 11/22, G11c 11/42

[58] Field of Search ............340/173 LS, 173 LM, 340/174.1 M, 173.2

[56] References Cited

UNITED STATES PATENTS 3,374,473 3/1968 Cummings.................. 340/174.1 M

*Primary Examiner*—Terrell W. Fears

*Attorney, Agent, or Firm*—Harry A. Herbert, Jr.; Robert K. Duncan

[57] ABSTRACT

Information to be stored is written into a single crystal of bismuth titanate, by either direct electrodes, photoconductors, or electron beams. Storage is by oppositely switched domains in the poled bismuth titanate crystal. The crystal is positioned between crossed polarizers, positioned 45° from extinction, and rotated about the *b* axis such that an OFF state by thickness extinction occurs for one of the domains; the opposite domain then being in an ON state. Readout in one embodiment is by monochromatic light. In another embodiment a second bismuth titanate crystal is positioned adjacent the storage crystal and oriented such that its *b* axis is perpendicular to the *b* axis of the first crystal to provide a storage system that is read out with white light. In this second embodiment the second crystal makes the total retardation through it and through one domain of the storage crystal zero which gives no transmission of light, that is, an OFF state; the other domain providing an ON state.

4 Claims, 11 Drawing Figures

PATENTED SEP 10 1974 3,835,459

SHEET 4 OF 7

BIREFRINGENCE READ $Bi_4Ti_3O_{12}$ DISPLAY AND MEMORY DEVICE

This is a division of application Ser. No. 232,173, filed Mar. 6, 1972.

BACKGROUND OF THE INVENTION

The field of this invention is in ferroelectric information storage devices. The prior art is well exemplified by the following patents: 2,909,972 patentee R. B. DeLano, Jr.; 2,928,075 and 2,936,380 patentee J. R. Anderson; 3,229,261 patentees E. Fatuzzo et al.; and 3,374,473 patentee S. E. Cummins.

Additional technical information and a more complete theoretical discussion of this invention and the comparison of it with the prior art may be found in the applicants' published technical papers, "A New Method of Optically Reading Domains in Bismuth Titanate for Display and Memory Applications" published in IEEE Transactions on Electron Devices Vol. ED-18, Number 9, September 1971, pp. 761–768, and "Efficient White-light Reading of Domain Patterns in Bismuth Titanate" published in Ferroelectrics Vol. 3, February 1972 Nos. 2, 3, and 4. For a complete description of the ferroelectric and optical properties of $Bi_4Ti_3O_{12}$ in terms of the monoclinic crystal symmetry reference is made to one of the co-inventors publications "Electrical and Optical Properties of Ferroelectric $Bi_4Ti_3O_{12}$ Single Crystals" in the Journal of Applied Physics, Vol. 39, pp. 2,268–2,274, April 1968, and his previous Pat. No. 3,374,473.

SUMMARY OF THE INVENTION

An optical read storage device comprising a *c*-plate of a single crystal of $Bi_4Ti_3O_{12}$ positioned between crossed polarizers in which information is read into the crystal in a conventional manner and the crystal oriented in a beam of monochromatic light to provide differential-retardation readout provides a system having relatively high contrast ratios (greater than 100:1), efficiencies of the order of 10 to 15 percent, and resolutions of 50 to 60 lines/mm. By adding a second *c*-plate crystal of a single crystal of $Bi_4Ti_3O_{12}$ to the foregoing apparatus, which is positioned to compensate one domain in the storage crystal to zero retardation, the stored information may be read out with conventional white-light with contrast ratios of approximately 20:1 and efficiencies of approximately 16 percent. The devices of the invention are insensitive to optical degradation or "depoling" which has been a serious limitation to the prior art devices after repeated polarization reversals. For example, typical embodiments of the invention have been operated in fast (1 to 2$\mu$ sec.) pulse switching for over 200 hours without showing any optical degradation when read by either the differential-retardation system or the compensation system.

The invention herein disclosed presents a new system of apparatus providing greatly improved results for optically reading images or other information stored as ferroelectric domain patterns in $Bi_4Ti_3O_{12}$ single crystals. The previously referenced prior art Pat. No. 3,374,473, uses the differences in the extinction directions in opposite domains for optically detecting these domains; this necessitates operation near extinction which allows only a small percentage of the reading light beam to pass through the system. The present invention makes use of differences in birefringence with the crystal oriented out of extinction which allows much more efficient use of the reading light beam. This increased efficiency permits the direct optical reading of stored images or other information with relatively low power light sources, and provides a system having a greatly improved optical signal-to-noise ratio compared to the prior art devices. In addition to the direct viewing of images the disclosed system provides for the reading of information as absorption holograms, as opposed to a somewhat related system providing for reading pure phase holograms in $Bi_4Ti_3O_{12}$.

DESCRIPTION OF THE PREFERRED EMBODIMENTS

The scientific details and theory of operation of the invention are thoroughly set forth in the previously referenced publications, therefore primarily only the data and information necessary to construct the apparatus of the invention will be contained herein. Two embodiments will be described in detail. The first embodiment is depicted schematically in FIG. 1. In this embodiment readout is by monochromatic light with the light output dependent upon the difference in retardation in opposite-polarity domains. This embodiment may be termed the differential retardation or monochromatic light embodiment. The second embodiment depicted schematically in FIG. 3 may be read out by white light. The construction of this embodiment is similar to that of the first except for the positioning of a compensator cyrstal in the light path. This embodiment may be termed the white light or compensated retardation embodiment. Generally the path of light through embodiments of the invention will be shown as a straight line, however it is to be understood that this is not a requirement and that for convenience of design the light path through the system may be reflected or refracted as is common in other optical systems.

Figures 4A, 4B, 4C:
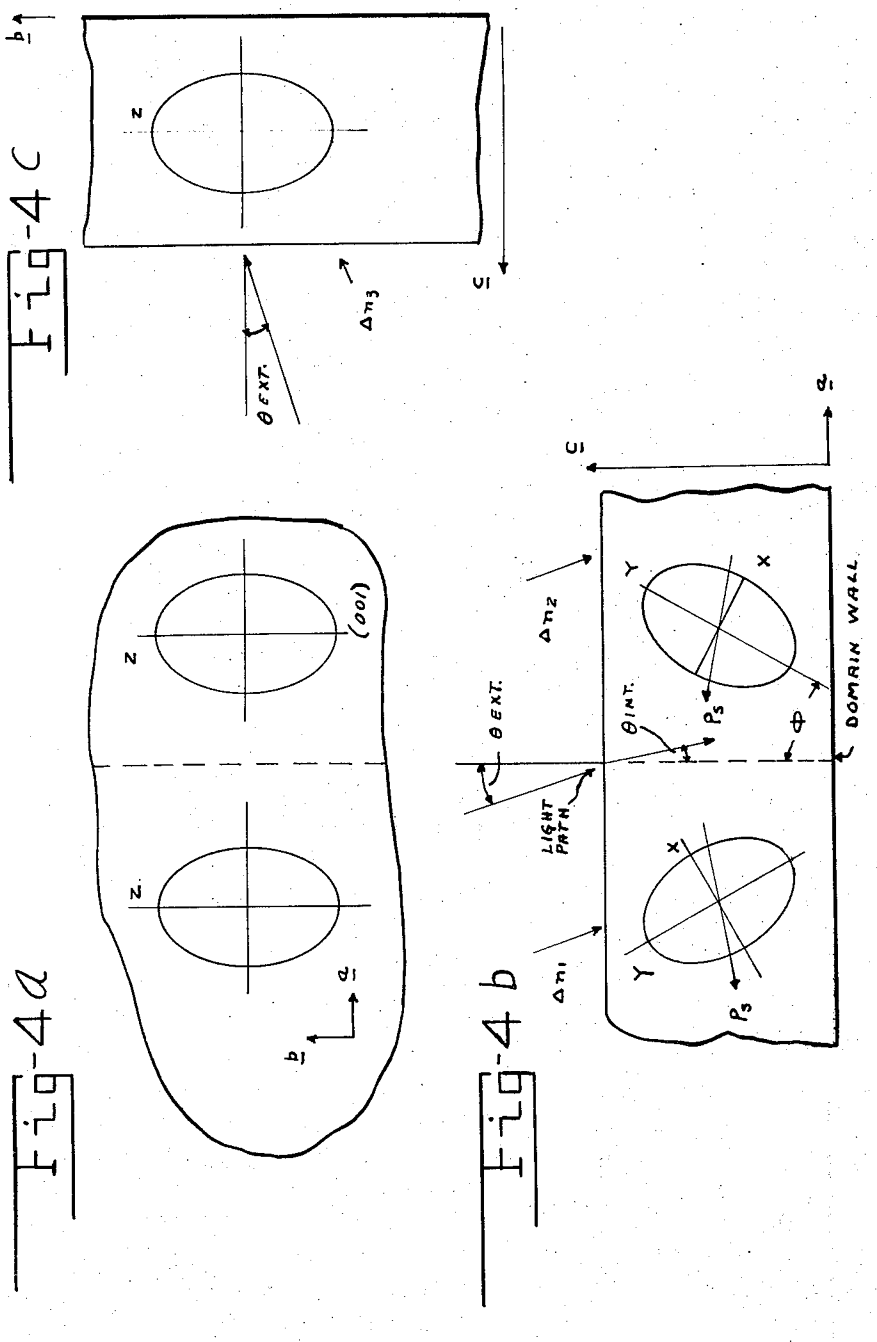
FIGS. 4*a*, 4*b*, and 4*c* are representative sketches showing the optical indicatrix of $Bi_4Ti_3O_{12}$ for opposite *c* domains.
Figure 5:
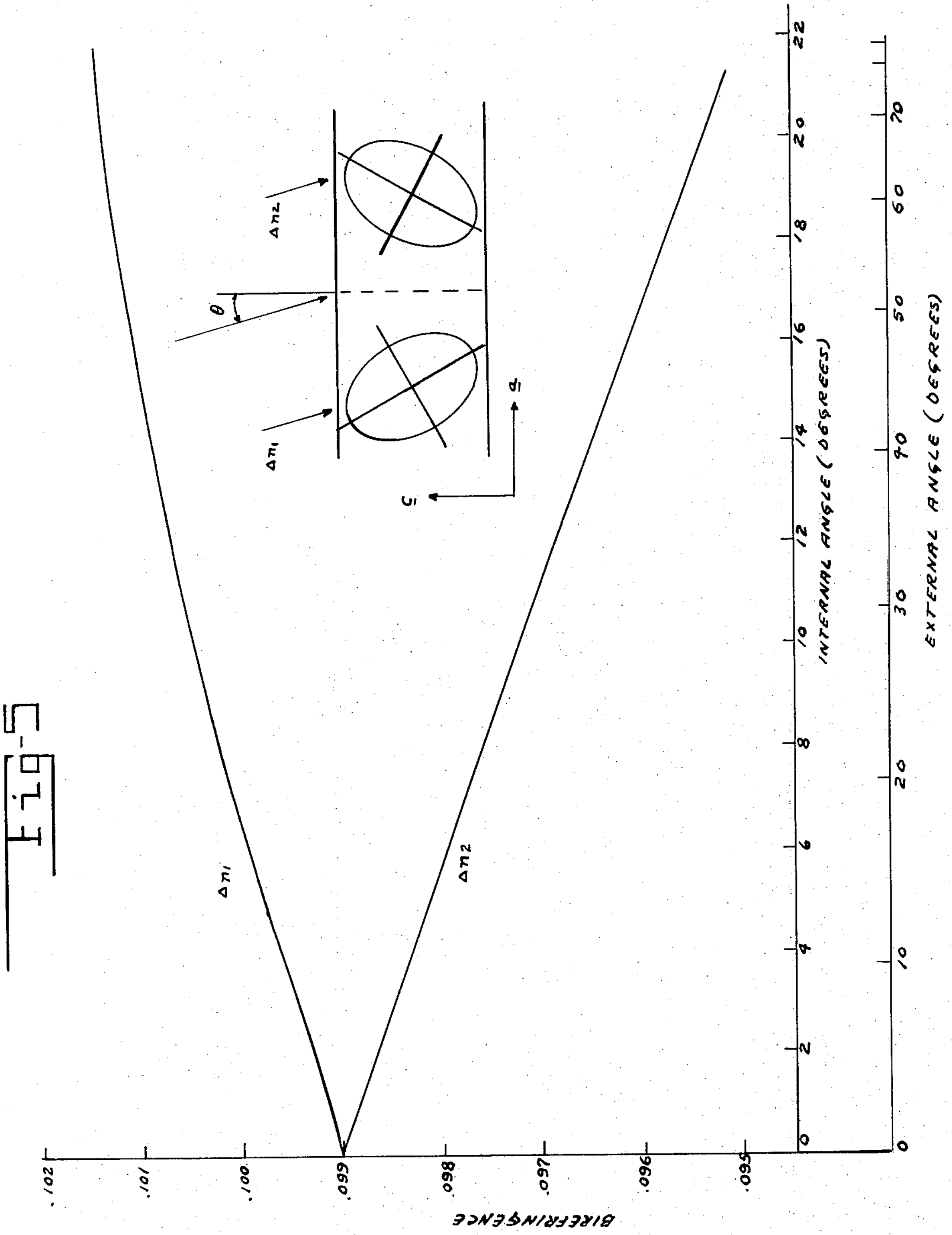
FIG. 5 is a typical plot (for $\lambda = 632.8$ nm) of the birefringence as a function of tilt angle $\theta$ for opposite domains with the path of the light in the *a–c* plane.

Briefly, bismuth titanate ($Bi_4Ti_3O_{12}$), a major element in the apparatus of the invention, is a ferroelectric crystal having a large spontaneous polarization (approximately 50 $\mu C/cm^2$) lying nearly in the plane of the (as-grown) thin flat crystals (i.e., the *a–b* plane). Switching of a component of $P_s$ (spontaneous polarization) along the *c* axis (normal to the flat plates) gives a hysteresis loop with approximately 4 $\mu C/cm^2$ of spontaneous polarization being switched. This type of switching is unique to $Bi_4Ti_3O_{12}$ and results in a large difference in the optical properties of domains that differ only in the *c* axis component of polarization. The optical properties are summarized in FIGS. 4*a*, 4*b*, and 4*c*. The optical indicatrix is a triaxial ellipsoid which shows the refractive index as a function of direction in the crystal. This indicatrix determines the optical properties such as the extinction directions and the birefringence values for different light paths through the crystal. The operation of the $Bi_4Ti_3\ O_{12}$ crystal in Pat. No. 3,374,473 was based primarily upon the difference in extinction directions, as would be shown in FIGS. 4*a*, 4*b*, and 4*c* in a view down the *b* axis (or a reduced difference in extinction angles in other positions) to detect optically information stored in the ferroelectric domains. The present invention makes use of the birefringence difference obtained by tilting the crystal around the *b* axis and using incident polarization at approximately 45° to the *a–c* plane. The difference in birefringence for this orientation may best be understood from the curves and crystal illustration in FIG. 5. The birefringence curves of FIG. 5 are calculated from the orientation of the optical indicatrix and its principle values, X, Y, and Z shown in FIGS. 4*a*, 4*b*, and 4*c*. The birefringence for the light path in the *a–c* plane at an angle $\theta$ from *c* is the difference between Z and the magnitude of the radius of the XY ellipse perpendicular to the internal light path. The birefringence dependence on $\theta$ (tilt angle) can be calculated from X, Y, Z and $\phi$ by conventional algebraic techniques. Table I below given the experimental data needed to determine X, Y, Z and $\phi$ for three wavelengths. For a wavelength different from that given in the table the values of X, Y, Z and $\phi$ can be experimentally determined by conventional optical techniques or extrapolated from the table values.

TABLE I

EXPERIMENTALLY DETERMINED PROPERTIES OF THE OPTICAL INDICATRIX

| $\lambda$ | 632.8 nm | 589 nm | 546.1 nm |
|---|---|---|---|
| $\Delta n_c$ | .099 | .104 | .1077 |
| $\Delta n_b$ | .011 | .126 | .1034 |
| $\phi$ | 29° | 27° | 24° |

$\lambda$ = wavelength
$\phi$ = angle Y makes with *c* axis
$\Delta n_c$ = birefringence for light path down *c*
$\Delta n_b$ = birefringence for light path down *b*

Since the birefringence is simply the difference in index for the particular section of indicatrix normal to the light path, it can be seen from FIGS. 4 and 5 that a light path exactly down the *c* axis gives identical birefringence for opposite domains. However, as the crystal is rotated around the *b* axis to give a light path directed at an angle $\theta$ from *c*, the birefringence of one domain increases while that of the other decreases, as shown in FIG. 5. These changes are due entirely to the ellipses in the *a–c* plane since the index Z along the *b* axis is the same for both domains and is unchanged by the rotation around the *b* axis. The total retardation R for the two domains is $$R_1 = \Delta n_1\ (t/\cos\theta_{INT.}) \quad (1)$$

$$R_2 = \Delta n_2\ (t/\cos\theta_{INT.}) \quad (2)$$

where $\Delta n_1$ and $\Delta n_2$ are the birefringences in the respective domains and are functions of tilt angle expressed in terms of external or internal tilt angle. $\theta_{INT.}$ is the internal tilt angle — the angle between the *c* axis and the light path in the crystal, $\theta_{EXT.}$ is the external tilt angle — the angle between the *c* axis and the incident light path as measured external to the crystal ($\theta_{INT.}$ is approximately related to $\theta_{EXT.}$ by Snell's law), *t* is the crystal thickness (measured along the *c* axis), and $t/\cos\theta_{INT.}$ is the optical path length in the crystal.

When the crystal is operated between crossed polarizers and at 45° to the extinction position, then a dark (OFF) state is achieved by choosing *t* and $\theta$ such that the total retardation for one of the domains is Nλ for a "thickness extinction." Where N is an integer, and λ is the wavelength of the light. The other domain, in general, will be out of thickness extinction, and for optimum contrast its retardation must be $R = (N \pm ½)\lambda$. Any odd multiple of λ/2 would suffice; however, practical limitations on *t* and $\theta$ require a difference in retardation of λ/2. Thus, our design for crossed polarizers is based upon the following equations:

$$R_1 = N\lambda = \Delta n_1\ (t/\cos\theta_{INT.}) \quad (3)$$

or $$R_2 = N\lambda = \Delta n_2\ (t/\cos\theta_{INT.}) \quad (4)$$

and $$|R_1 - R_2| = \lambda/2. \quad (5)$$

If desired, the design could be based equally well upon parallel polarizers.

Figure 6:
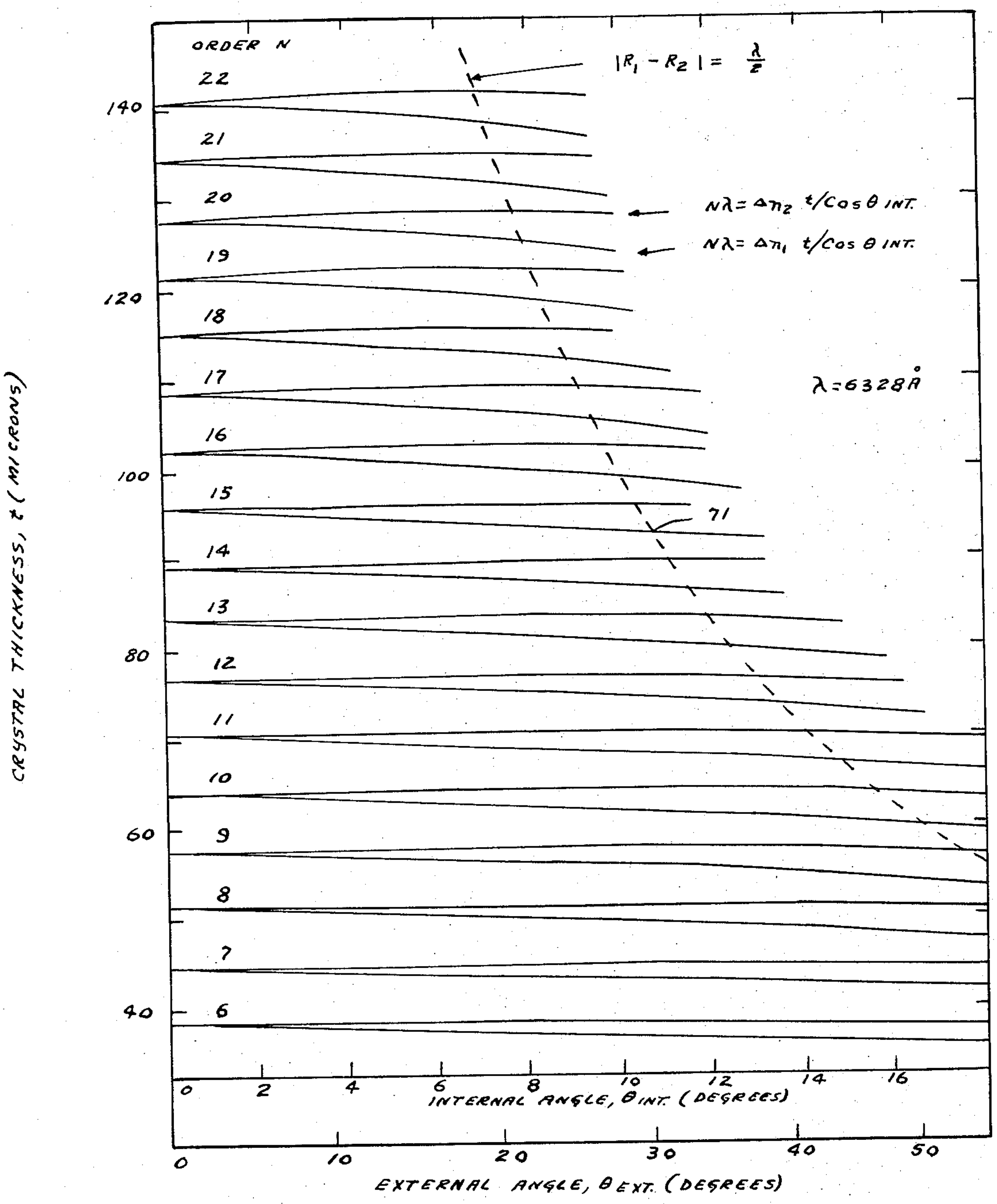
FIG. 6 is a representative plot (for $\lambda = 632.8$ nm) of crystal thickness and tilt angles showing the parameters for thickness extinction.

The effect of the crystal tilt $\theta$ and the crystal thickness *t* can be visualized best by graphical consideration of these design criteria. FIG. 6 shows a plot of equations 3 and 4 above for N = 6 to 22, together with a plot of 5 for λ = 632.8nm. This data shows the calculated thicknesses and tilt angles giving "thickness extinction" for the two opposite domains in $Bi_4Ti_3O_{12}$ (solid curves) for orders 6 through 22. The broken curve shows the angle and thickness which give an optimum retardation difference in opposite domains. Any point on the solid curves is a possible operating point; points at the intersection of a solid curve and the broken curve are points of optimum contrast and efficiency. Calculations were made using index values and indicatrix orientation for λ = 6328 A, as follows; X = 2.5984, Y = 2.6094, Z = 2.7000, and $\phi$ = 29°. The condition of 5 is not critical, and, in fact, a retardation difference of λ/4 gives only a small loss (about 3dB) in transmitted light in the ON state. More critical is the condition of 3 or 4 for thickness extinction of one of the domains. Since the changes in birefringence with tilt angle are quite small values superimposed on a large birefringence along $c$, the primary variable that can be adjusted to satisfy either 3 or 4 is the crystal thickness $t$. As the crystal is tilted, the birefringence increases in one domain and decreases in the other, as shown in FIG. 5. Also, the tilt results in an increased length in the light path, $t/\cos\theta_{INT.}$, through the crystal. Thus, it can be seen from the curves for $R = N\lambda$ that for $\Delta n_2$, these effects tend to cancel, making the thickness-extinction condition quite insensitive to tilt angle. For $\Delta n_1$, the tilt has a greater effect since the increased path length and increased $\Delta n$ are additive effects.

Figure 7:
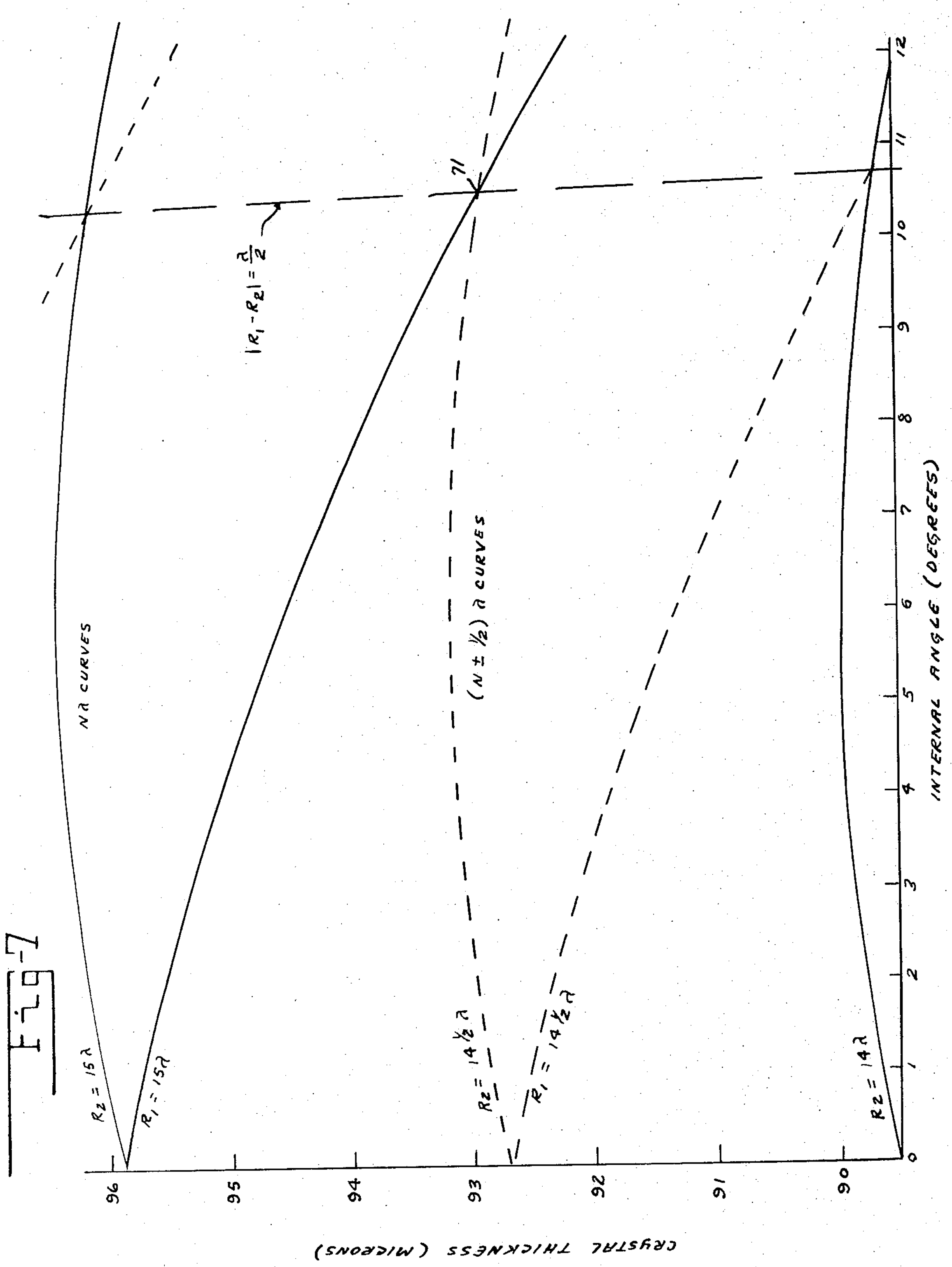
FIG. 7 shows an enlarged view of a specific area of the curves shown in FIG. 6.

FIG. 7 is a segment of FIG. 6 with the thickness scale expanded, which shows in more detail the various design conditions necessary for optimum reading by the differential-retardation method. The Nλ curves (solid lines — minimum transmission) represent the "thickness extinction" condition or OFF state for each domain for the appropriate order N. The (N ± ½)λ curves (broken lines — maximum transmission) represent the maximum transmission condition or ON state for each domain. Thus, if the domain with a birefringence of $\Delta n_1$ is chosen for the OFF state, then the "extinction condition" will be satisfied for any angle and thickness combination on the $R_1 = N\lambda$ curve. The intersection of any Nλ curve and any (N ± ½)λ curve represents an operating point which gives optimum contrast between oppositely switched domains. These optimum operating points are also represented by the intersection of the Nλ curves and the curve of equation 5. These optimum operating points are separated by about 3 μm of crystal thickness, which indicates that a uniformity of thickness in the order of ordinary optical tolerances (about ±λ/8) is sufficient to provide uniform contrast over the crystal area. The choice of crystal thickness and tilt angle $\theta$ is dictated to some extent by the resolution, contrast, and efficiency required of the device. For an optimum design in terms of contrast and efficiency, 3 or 4 and 5 must be satisfied. The tilt angle $\theta$ must be limited to about 30° in order to keep the storage plane in reasonable focus and avoid loss of resolution. With this limitation crystal thicknesses of about 90 to 100 μm result for the optimum case. Thinner crystals in the range of 30 to 40 μm (a lower limit for convenient handling) give improved resolution as shown in the following Table II. Thus, if resolution is of primary interest, the requirement of 5 may be relaxed and the device operated with improved resolution but reduced contrast and efficiency.

which gives optimum transmission in the ON state. This is indicated at 71, in FIGS. 6 and 7.

If the exact thickness desired is not obtained, the final adjustment for best thickness extinction can be made by varying the tilt angle $\theta$. A correction for an error in thickness of 0.25 μm can be made by changing the angle $\theta_{INT.}$ by about 1°. Of course the best procedure for verifying the thickness (and flatness) is an optical check in monochromatic light, together with a dial gauge measurement to determine the order (N).

Figure 1:
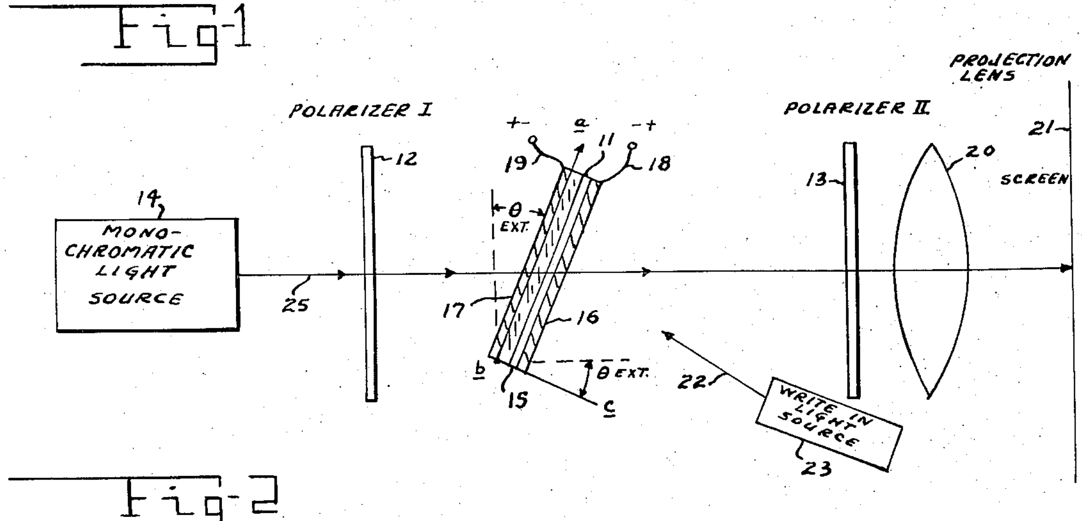
FIG. 1 is a schematic diagram of an embodiment of the invention using a monochromatic light source.
Figure 2:
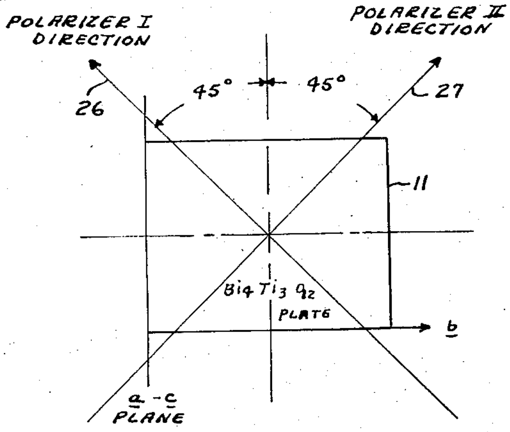
FIG. 2 is a representative axial pictorial view showing the relationships of the crossed polarizers with the orientation of the $Bi_4Ti_3O_{12}$ crystal.

In a typical embodiment of a differential retardation information storage and read device of the invention as shown in FIG. 1 the $Bi_4Ti_3O_{12}$ plate 11 is positioned between the crossed polarizers 12 and 13. The second polarizer 13 is frequently termed an analyzer. The polarization directions of the polarizers are at 90° as shown in FIG. 2. The polarization directions of the polarizers may be interchanged without effecting the operation. The 45 and 90° angle relationships are optimum but not excessively critical with only slight degradations occurring for nominal deviations in the accuracy of positioning. The path of the propagating light 25 from the source 14 is first through polarizer 12 where it becomes polarized to the direction 26 (FIG. 2). Without the crystal in place it is to be noted that with the plane of polarization 27 of the second polarizer 13 at 90° to that of the first polarizer no light will pass through the system to the screen 21. The crystal 11 is positioned in the light path between the polarizers at 45° from extinction. That is with its $a$, $b$, and $c$ axes as shown in FIG. 2. The crystal is then tilted about its $b$ axis through angle $\theta$ until one domain is in extinction, that is, OFF or minimum light in the display. The angle $\theta$ is, as set forth, determined by the retardation of the light through the crystal. The monochromatic light source 14 may be a filtered white light source, a laser or any other conventional monochromatic light source. In a typical embodiment the monochromatic light source was a Ne-He laser having emission at 632.8 nm. As previously mentioned in the table, when using a laser having polarized light output the first polarizer 12 is not needed. (The polarization direction of the laser emission is properly positioned with respect to the crystal and the second polarizer, i.e., as represented by line 26, FIG. 2). Other frequencies of monochromatic light may be used with the invention, and while the curves shown in FIGS. 6 and 7 will not be quite the same for other wavelengths since they were calculated for λ = 6328A the criteria as previously set forth may be applied to embodiments using monochromatic light of different wavelengths. For other wavelengths the principal index values of the optical indicatrix can readily

TABLE II

PERFORMANCE CHARACTERISTICS OF TWO BISMUTH TITANATE PHOTOCONDUCTOR DEVICES USING THE DIFFERENTIAL-RETARDATION READ METHOD

| Crystal Thickness (μm) | Difference in Retardation | $\theta_{EXT.}$ | $\theta_{INT.}$ | Efficiency (percent) | Contrast Ratio | Resolution (lines/mm) |
|---|---|---|---|---|---|---|
| 93.3 | ~λ/2 (0.45) | 26° | 9.3° | 12 | 100:1 | 50–60 |
| 37.4 | λ/6 | 24° | 8.7° | 5 | 40:1 | 80–90 |

Efficiency=(light intensity out/light intensity in) X100 percent where all losses are included, namely: reflection loss due to crystal tilt; crystal absorption; analyzer losses (Polaroid HN22) — a polarizer was not required since a laser was used for these measurements.

A typical design of an embodiment may be pursued as follows. Choose $R_1 = 15\lambda$ and $\theta_{INT.} = 10.5°$, then $t$ = 92.9 μm is required. This results in $|R_1 - R_2| = \lambda/2$, be obtained in the conventional manner from measured birefringence values. Curves similar to those shown can be calculated for any other particular wavelength. For example, when using monochromatic light of $\lambda = 546$ nm, and electing to keep approximately the same tilt angle of 10.5 (internal) and a retardation difference of $\lambda/2$ the corresponding crystal thickness is approximately 78 $\mu$m instead of the 92.9 $\mu$m previously shown to be preferred for the 632.8 $\mu$m wavelength. The apparatus and operation of the system for write-in and readout is of course the same for all wavelengths, with merely the crystal thickness and the tilt angle being subject to change.

Writing information into the $Bi_4Ti_3O_{12}$ crystal may be done by any conventional means such as (1) *x-y* matrix array (2) electron beam addressing, or (3) optical addressing through a photoconductor on the crystal. These types are well known and fully described in the references previously given. For completeness of the disclosure herein the photoconductor write-in system will be briefly described. In the schematic diagram of an embodiment as shown in FIG. 1 the $Bi_4Ti_3O_{12}$ crystal 11, has a typical organic photoconductor 15 of polyvinyl carbazole (PVK) doped with 2,4,7-trinitro-9-fluorenone (TNF) spun onto one side of the crystal. (Either side may be used.) Semitransparent gold films 16 and 17 are conventionally deposited on both sides of the photoconductor-ferroelectric "sandwich". Contacts 18 and 19 are made in the conventional manner to the respective electrodes 16 and 17, and through them from a conventional electrical source the charge that switches the spontaneous polarization of the crystal elements flows. The writing beam 22 and its source and control 23 cooperates with the polarity of the electrodes for placing in the crystal the information to be stored. Information may be written into a crystal with the crystal outside the reading apparatus, and then read out at a later date, or the information may be written into the crystal with the crystal in the reading apparatus. Either contact "printing" or object imaging or light beam scanning may be used for writing information into the crystal. Simultaneous read-out and write-in may be accomplished by using a read-out light intensity below that required to switch the crystal or by using a photoconductor having a low sensitivity to the read-out light frequency and using a write-in light of the frequency of maximum photoconductor sensitivity. Generally write-in is done separately from read-out, that is, after write-in the switching voltage is removed from the electrodes, so that no possible switching will occur during read-out. Then a high intensity read-out light may be used. While a spot beam may be used for read-out, generally a flood beam is used and the complete area of the crystal simultaneously read out. It has been found that some photoconductors perform the switching of the crystal more effectively for one polarity of applied voltage across the photoconductor and crystal than for the opposite polarity. For example, the TNF doped PVK photoconductor has been found to generally have better control of changing the state of individual crystal elements when the electrode next to the PVK layer has a negative potential. (The electrode contacting the crystal on the opposite side of the sandwich is at that time positive.) Thus, it is generally desirable to erase the crystal, that is change it uniformly to one state of light transmission with electrode 16 positive, electrode 17 negative and a high intensity flood beam 22 covering the whole crystal. The crystal will then be in the nontransmitting or OFF state if the *a* axis component of $P_s$ is directed along the positive *a* axis direction as shown in FIG. 1. It will be the ON state if the *a* axis component of $P_s$ is directed along the negative *a* axis direction. In either event the state can be transposed by rotating the crystal in a counter-clockwise manner about the *b* axis by an amount $|\theta_{EXT.}|$. FIG. 1 shows the crystal tilted or rotated in the clockwise direction about the *b* axis by an amount $|\theta_{EXT.}|$. Write-in is then made with electrode 16 negative and electrode 17 positive. A suitable source illuminating the crystal for contact printing type write-in has been found to be a 200-watt mercury lamp. Flux densities of the write-in (or erase) illumination of the order of $50mW/CM^2$ are suitable. 300 to 400 volt switching potentials are also suitable for switching the elements of the crystal for crystal thickness as previously described. (Switching fields of approximately 50KV/cm are generally suitable.) Additional details of photoconductor write-in may be found in the previously mentioned referenced publication appearing in the September 1971 IEEE Transactions on Electron Devices. The *x-y* matrix array type of writing in information is well known and exemplified by the previously referenced Pat. No. 3,374,473. The electron-beam writing of information into the crystal is set forth in the publication entitled "Electron-Beam Writing of Ferroelectric Domains in $Bi_4Ti_3O_{12}$ Single Crystals" by S. E. Cummins and B. H. Hill appearing in Proceedings Letters pages 938–939 of Proceedings of the IEEE, Vol. 58, No. 6 for June 1970.

The reading of the stored information with monochromatic light may be done with a microscope (visually or photographically), or by projection using a conventional projection lens system 20 and viewing screen 21, with the stored information displayed on the screen.

Figure 3:
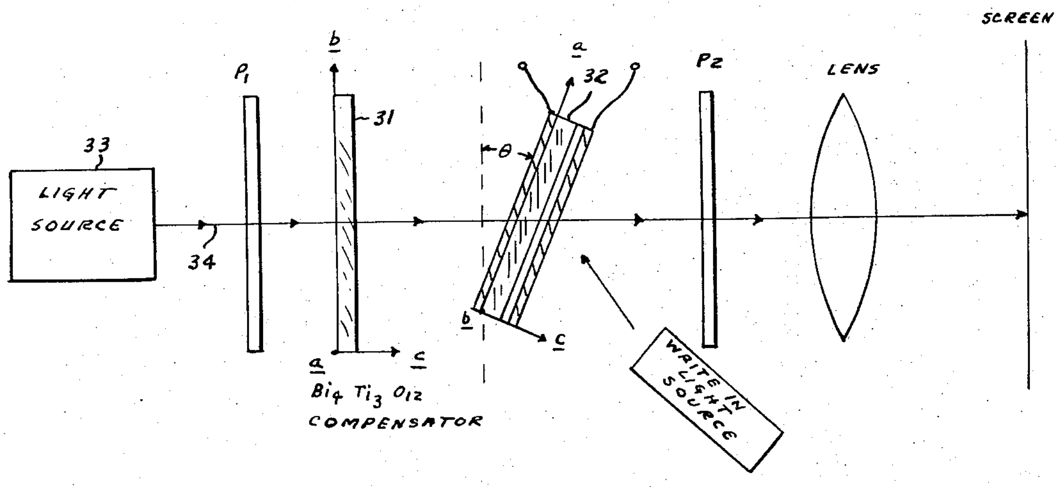
FIG. 3 is a schematic diagram of an embodiment of the invention using a white light source.
Figure 8:
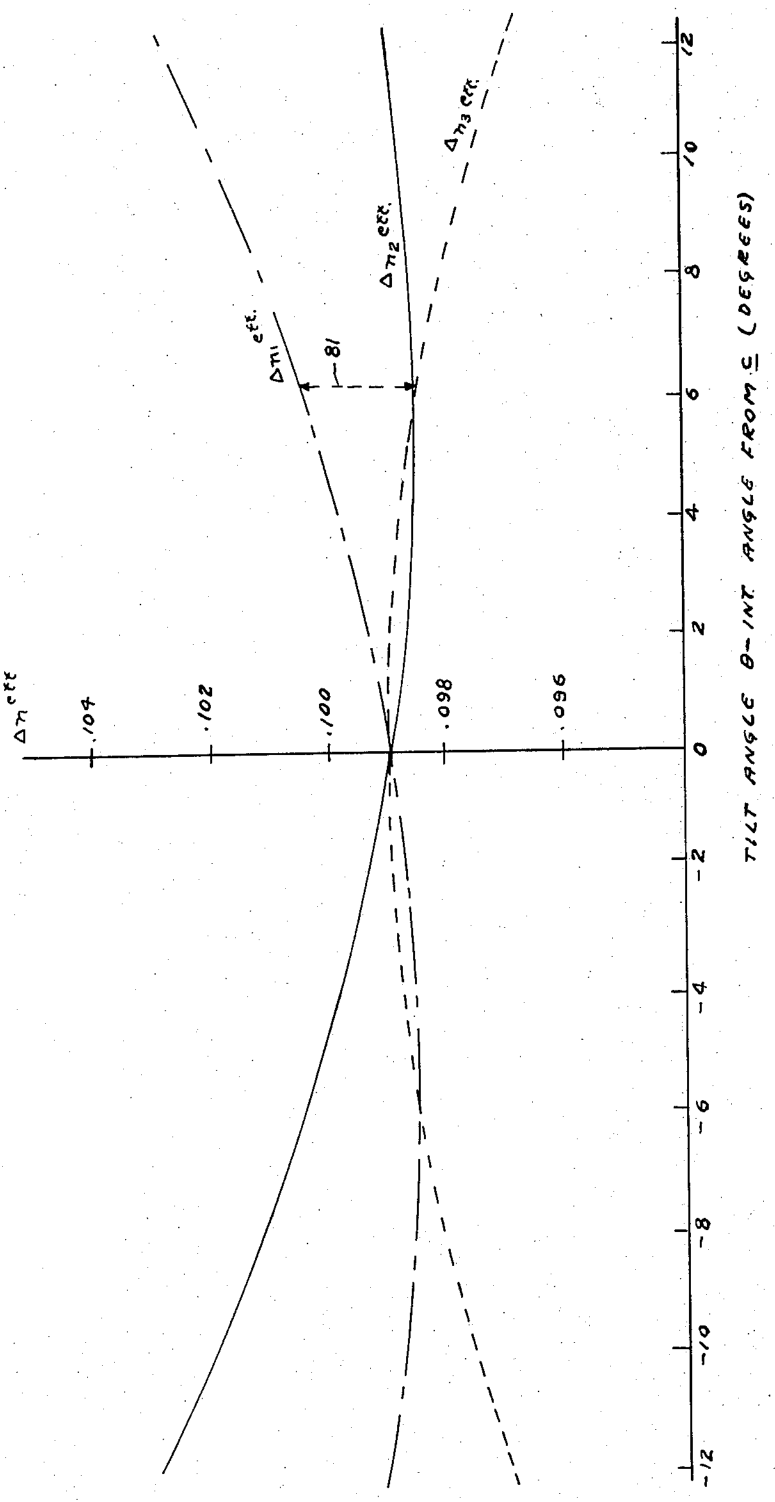
FIG. 8 is a plot showing the calculated variation of effective birefringence as a function of the internal tilt angle ($\theta_{int.}$) for the opposite doamins and the operating angle of a typical crystal pair.

The compensation embodiment shown schematically in FIG. 3 is similar to the differential-retardation embodiment shown in FIG. 1 except for the addition of a compensator crystal 31 which permits the use of white light (as well as monochromatic light) for read out. The writing of information into the storage crystal and its operation in storing the information is the same as described in the differential-retardation embodiments. The compensator crystal 31 is also a crystal of $Bi_4Ti_3O_{12}$ like the storage crystal 32. It is positioned in the light path 34 adjacent to the storage crystal 32. Either side of the storage crystal is satisfactory. Both the storage crystal and the compensator crystal must be between the two polarizers. It is to be understood that refractive and reflective devices, such as lenses, may be inserted anywhere in the optical path, such as between the storage crystal and compensator crystal. Both the $Bi_4Ti_3O_{12}$ compensator crystal 31 and the $Bi_4Ti_3O_{12}$ storage crystal 32, as before, are preferably poled for uniform *a*-axis spontaneous polarization. The optical indicatrix orientations for two domains of opposite *c* spontaneous polarization are as previously shown in FIGS. 4*a*, 4*b*, and 4*c*. The crystal orientation of primary interest in this embodiment is the same as that for the differential-retardation read embodiment — the crystal is out of extinction between crossed polarizers and the path of the incoming light is in the *a-c* plane at an angle $\theta_{EXT.}$ from the *c* axis. Both the differential-retardation embodiment and the present compensation reading embodiment are based upon a difference in the birefringence $\Delta n_1$ and $\Delta n_2$ which results from the opposite tilt of the indicatrix position in the two domains. In order to take into account the increased path length due to the tilting of the crystal, an *effective birefringence*, $\Delta n^{eff} = \Delta n/\cos \theta_{INT.}$, is used throughout the following description. The total retardation, R, for a "c-plate" of thickness $d$ is simply $R = d\Delta n^{eff}$. The angles $\theta_{INT.}$ and $\theta_{EXT.}$ are, as before, the light path angles, as measured from the crystal $c$ axis, internal and external to the crystal, respectively. The calculated variation of effective birefringence as a function of tilt angle $\theta_{INT.}$ for the opposite domains is shown in FIG. 8 as $\Delta n_1^{eff}$ and $\Delta n_2^{eff}$; the variation of birefringence for light in the $b$-$c$ plane (tilt around the $a$-axis) is shown as $\Delta n_3^{eff}$.

In the previous differential-retardation read embodiment the off state is obtained for one of the domains by making the total retardation equal to an integral number of wavelengths for the monochromatic light used. This results in a "thickness extinction" for that domain and, with proper design, an out-of-extinction case for the opposite on domain. This type of operation requires highly monochromatic light and precise polishing of the crystal to a predetermined thickness for extinction at the desired operating angle. In this retardation compensation embodiment a second compensating crystal is used which is rotated 90° with respect to the operating crystal. When two crystals of approximately equal thickness are used, their retardation can be made equal but opposite for a compensated off state for one of the domain. The use of the same material, i.e., bismuth titanate, in the compensator and in the operating crystal results in an excellent black compensation in white-light illumination since dispersion effects cancel and good compensation exists throughout the visible range of wavelengths. The change in total retardation when the operating crystal is switched is adjusted by means of the tilt angle and crystal thickness to give a first-order white for the on state. Generally no electroding or switching of the compensator crystal is used or necessary; however, for some applications (e.g., to electrically produce a negative of a stored pattern), switching of the compensator crystal may be useful. It is satisfactory to use unpoled material in the compensator if the compensator is operated with zero tilt or is tilted around the $a$ axis only. Poled compensator crystals may be tilted around either the $a$ or $b$ axes to achieve proper compensation, or polished to the correct thickness to be used with zero tilt.

Prime considerations in designing the crystal pair for compensated operation are (1) equal and opposite retardations must exist to produce the off state, and (2) the change in retardation with switching should produce the desired first-order white for the on state. A large number of possible thicknesses and tilt-angle combinations will satisfy these requirements; however, the generally preferred choice is the simple case of approximately equal crystal thicknesses and tilts for compensation of "like" domains in the compensator and operating crystal for the off state. The operating angle of an experimentally evaluated crystal pair is illustrated in FIG. 8 by the vertical broken line 81 which represents the change in birefringence with switching for an internal tilt angle of 6.2°. This change in $\Delta n^{eff}$ is approximately 0.002; hence, a 100 $\mu$m thick crystal will produce a change of 200 nm which has been found to produce a good first-order white. Either $\Delta n_1^{eff}$ or $\Delta n_2^{eff}$ can be obtained from the single-domain compensator by simply choosing the direction of tilt. The off state can be obtained by compensating $\Delta n_1^{eff}$ of the storage crystal with $\Delta n_1^{eff}$ of the compensator, or similarly $\Delta n_2^{eff}$ of the storage crystal can be compensated by $\Delta n_2^{eff}$ of the compensator. For parallel light the two cases are equivalent; however, for practical condenser light sources, the incoming cone of light rays makes the variation of birefringence with angle important since the operation is over a range of angles. From experimental operation, it has been found that the use of $\Delta n_2^{eff}$ in both the operating crystal and the compensator gives the best off state. This is as expected since $\Delta n_2^{eff}$ varies less with angle; thus, better compensation exists over the range of angles of the cone of incoming light. Also, the use of a cone of light introduces angles of tilt aroung the $a$ axis, bringing into play the $\Delta n_3^{eff}$ variation. It can be seen from FIG. 8 that $\Delta n_2^{eff}$ and $\Delta n_3^{eff}$ are closely matched, which also favors the use of $\Delta n_2^{eff}$ in the storage crystal and compensator for the off state.

An estimate of the tolerances that should preferably be maintained in preparing crystals for the compensated read system can be made from observations of birefringence colors in a crystal compensated with a small-angle wedge (or from a chart of birefringence colors). A reasonably dark extinction band exists for a net retardation of ± 20 nm. For around $n^{eff} = 0.10$, the ± 20 nm is equivalent to a thickness variation of ± 0.2 $\mu$m. Thus, it is generally preferable that the angle of tilt of the compensator crystal be adjustable and that the compensator crystal is polished to match the storage crystal, then it is not necessary to reduce the individual crystal tolerance to allow for "worst-case" variations. It has been found that quite good compensation can be achieved with individual crystal-thickness variations of ± 0.3 $\mu$m.

In a typical operating embodiment of the apparatus as shown schematically in FIG. 3 two $Bi_4Ti_3O_{12}$ crystals were ground to approximately the same uniform thickness of approximately 100 $\mu$m. The storage crystal 32 was positioned at a tilt of approximately 17° about its $b$ axis. It is generally desirable, but not necessary, to be able to vary the angle of tilt slightly to obtain the best compensation with a particular crystal. The compensator crystal 31 has its $b$ axis perpendicular to the b axis of the storage crystal. Likewise it is generally desirable to be able to rotate or tilt the compensator crystal slightly about its $b$ axis until maximum contrast is achieved. These minor adjustments are generally easier to perform than to measure the parameters of the crystal to the accuracy required to determine the exact angles. As previously mentioned, with a poled compensator crystal, which is generally preferred, it may be tilted around either the $a$ or $b$ axis to achieve maximum contrast. Note that the $b$ axis of the two crystal in both instances remain perpendicular. (When the compensator crystal is not poled the tilting is limited to only around the $a$ axis.) The light source 33 in a typical embodiment was a conventional 100 watt tungsten lamp with a heat filter and a relay-type condenser system.

Figure 9:
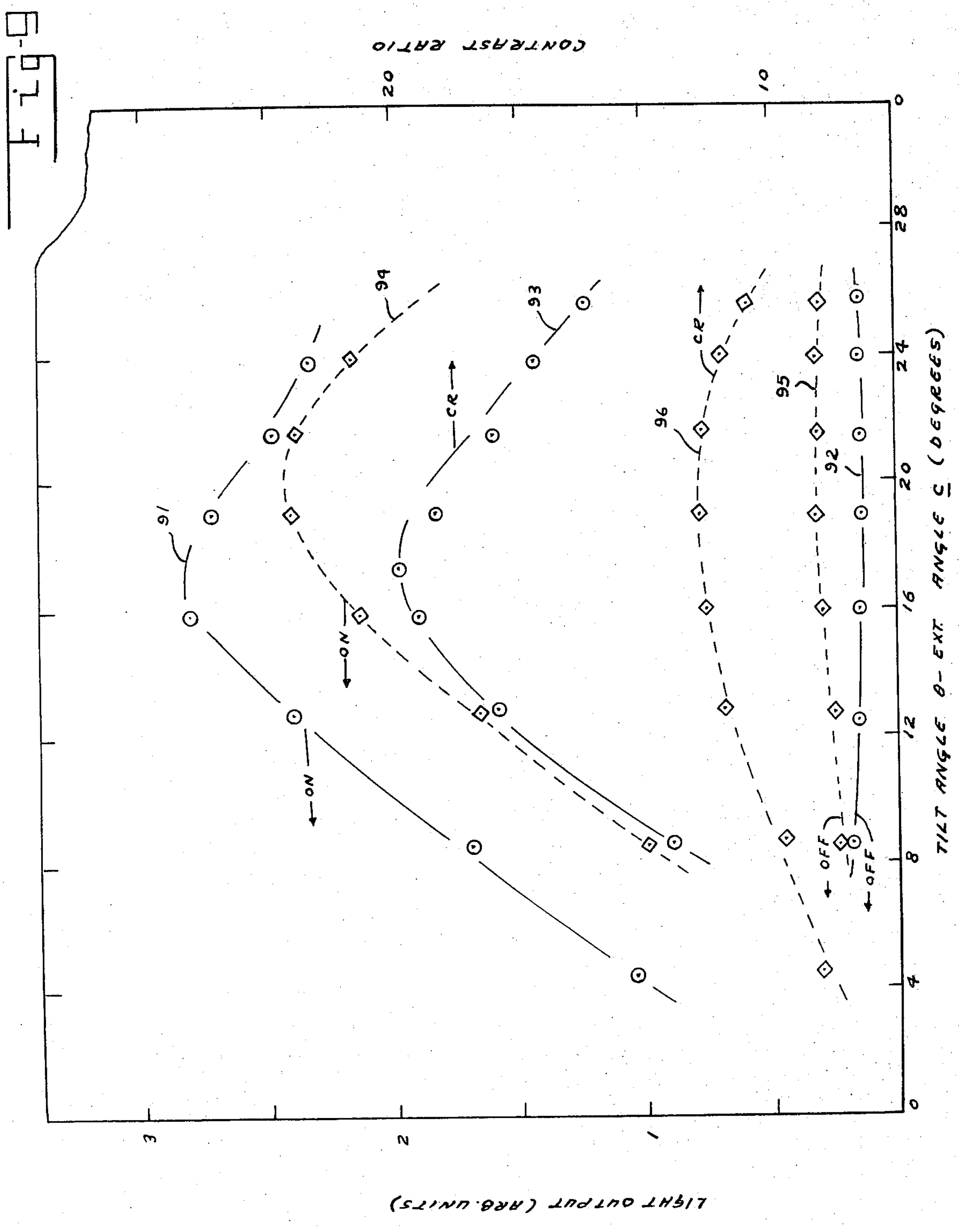
FIG. 9 is a typical plot of measured light output for "on" and "off" domains and the contrast ratio (CR) for two cases of compensation.

FIG. 9 shows the measured light output for on and off domains and the contrast ratio for two cases of compensation. In the first case represented by curves 91, 92, and 93 (on, off, and contrast ratio, respectively) the preferred $\Delta n_2^{eff}$, as previously stated and as described, was used. The crystals were then oriented slightly so as to operate in the $\Delta n_1^{eff}$ orientation and the respective measurements then produced curves 94, 95, and 96. The preferred $\Delta n_2^{eff}$ orientation can be seen to give considerably higher contrast ratios mainly because of the more effective compensation in the off state. This is due to the shape of the birefringence-vs-$\theta$ relationship as represented by the curves of FIG. 8. The relative flatness and nearly equal magnitudes of $\Delta n_2^{eff}$ and $\Delta n_3^{eff}$ result in more effective compensation throughout the range of angles of the incoming cone of light which, in the particular embodiment from which the data of FIG. 9 was obtained, had a total angle of about 30°.

The *a*, *b*, and *c* axes referred to herein are the crystallographic axes of the crystal. The physical crystal may be cut along these axes as shown in the drawing, however this is not a requirement. The crystals as grown are normally in the form of flat plates with the *c* axis perpendicular to the major surfaces. It is the thickness of the crystal, i.e., the dimension along the *c* axis, that is the controlling dimension as taught herein. Round or irregular shaped crystals in the *a-b* plane may just as satisfactorily be used.

While reference has been made herein to imply that the angle between the *a* and *c* axes is a right angle, it is to be understood that in the actual monoclinic structure of $Bi_4Ti_3O_{12}$ crystals these axes do not intersect at exactly 90°, however the deviation is so small that for practical purposes as used herein it is negligible.

We claim:

1. An information storage and display system comprising:

a. a light source providing a path of propagating monochromatic light;

b. a first polarizer having a direction of polarization positioned in the said light path polarizing the light passing therethrough;

c. a second polarizer having a direction of polarization positioned in the said path of light, further remote from the said source than the first polarizer, the said second polarizer having its polarization direction rotated about the path of light, 90° from the polarization direction of the first polarizer;

d. a single crystal of $Bi_4Ti_3O_{12}$ poled for substantially uniform *a*-axis spontaneous polarization;

e. means for switching the spontaneous polarization of the said crystal along the *c* axis to provide domains within the said crystal in response to the information to be stored;

f. the said crystal positioned between the said first and second polarizers in the propagating light path with its *a-c* plane parallel to the path of propagation, rotated substantially 45 degrees from extinction and tilted about its *b* axis to provide a thickness extinction for one of the said domains; and g. means for displaying the said light passing through the said second polarizer.

2. The apparatus as claimed in claim 1 wherein the said means for switching the spontaneous polarization of the said crystal includes:

a. a photoconductor positioned on the said crystal;

b. a first electrode positioned on the said photoconductor;

c. a second electrode positioned on the said crystal;

d. means for applying an electrical potential to the said electrodes; and e. a light source cooperating with the said potential.

3. An information storage and display system comprising:

a. a light source providing a path of propagating light;

b. a first polarizer having a direction of polarization positioned in the said light path adjacent the light source;

c. a second polarizer positioned in the said path of light having passed through the first polarizer, the said second polarizer having its direction of polarization rotated, with respect to the path of light, 90° from the plane of polarization of the first polarizer;

d. a first single crystal of $Bi_4Ti_3O_{12}$ having a first and second plane surface defining the crystal thickness normal to the crystallographic *c* axis, poled for substantially uniform *a* axis spontaneous polarization;

e. means for switching the spontaneous polarization of the said crystal along the *c* axis to provide domains of opposite spontaneous polarization within the said crystal in response to the information to be stored;

f. the said first crystal positioned between the said first and second polarizers in the propagating light path with the *a-c* plane of the said crystal parallel to the path of propagation, the said crystal rotated about its *c* axis 45° from extinction, and tilted about its *b* axis to provide a retardation difference in the said domains of opposite spontaneous polarization;

g. a second single crystal of $Bi_4Ti_3O_{12}$ poled for substantially uniform spontaneous polarization, positioned between the said first and second polarizers adjacent the said first crystal in the said path of light with the *b* axis of the second crystal perpendicular to the *b* axis of the first crystal with the *a-c* plane of the second crystal substantially parallel to the said path of the propagating light, the said second crystal having substantially the same thickness normal to its *c* axis as the thickness of the first crystal normal to its *c* axis, and the second crystal tilted about its *b* axis such that the total retardation to the light passing through the second crystal and one domain of the first crystal is substantially zero; and h. means cooperating with the said light passing through the said second polarizer for displaying the said information stored in the first cyrstal.

4. The apparatus as claimed in claim 3 wherein the said means for switching the spontaneous polarization of the said first crystal includes:

a. a photoconductor positioned on the said first plane surface normal to the crystallographic *c* axis of the said crystal;

b. a first electrode positioned on the said photoconductor;

c. a second electrode positioned on the said second plane surface normal to the crystallographic *c* axis of the said crystal;

d. means for applying an electrical potential to the said electrodes; and e. a second light source cooperating with the said electrical potential.

* * * * *

UNITED STATES PATENT OFFICE

CERTIFICATE OF CORRECTION

Patent No. 3,835,459 Dated September 10, 1974

Inventor(s) Theodore E. Luke et al.

It is certified that error appears in the above-identified patent and that said Letters Patent are hereby corrected as shown below:

In the title on the cover page, change "$Bi_4Ti_3O_2$" to -- $Bi_4Ti_3O_{12}$ --. Column 2, line 34, change "doamins" to -- domains --. Column 3, in Table 1, line 50, place "$\phi$" under "$\Delta n_b$". Column 5, line 47, change "5" to -- (5) --. Column 7, line 6, change "10.5" to -- 10.5° --. Column 8, line 24, change "writing in" to -- writing-in --. Column 9, line 17, change "off" to -- OFF --; line 31, change "domain" to -- domains --; line 60, change "off" to -- OFF --. Column 10, line 27, delete "around", change "$n^{eff}$" to -- $\Delta n^{eff}$ --.

Signed and Sealed this

*thirtieth* Day of *March 1976*

[SEAL]

*Attest:*

RUTH C. MASON
*Attesting Officer*

C. MARSHALL DANN
*Commissioner of Patents and Trademarks*